United States Patent [19]

Kempkers

[11] 4,221,354
[45] Sep. 9, 1980

[54] RETRACTABLE HOOK FOR A VEHICLE

[75] Inventor: Gordon B. Kempkers, Hamilton, Mich.

[73] Assignee: Prince Corporation, Holland, Mich.

[21] Appl. No.: 962,890

[22] Filed: Nov. 22, 1978

[51] Int. Cl.² ............................................. A47F 5/00
[52] U.S. Cl. ............................ 248/293; 224/42.45 A; 248/308
[58] Field of Search ................ 248/293, 308, 339; 296/37.1, 37.7, 37.8, 37.13; 224/29 L, 42.45 A; 297/DIG. 2

[56] References Cited
U.S. PATENT DOCUMENTS

| | | | |
|---|---|---|---|
| 633,742 | 9/1899 | Turner | 248/293 |
| 2,071,257 | 2/1937 | Hansen | 248/293 |
| 2,602,622 | 7/1952 | Smith | 248/293 |
| 2,706,049 | 4/1955 | Andrews | 248/293 X |
| 2,901,207 | 8/1959 | Adam | 248/293 |
| 3,126,229 | 3/1964 | Dickerson | 297/DIG. 2 |
| 3,362,669 | 1/1968 | Legge | 248/293 |
| 3,424,418 | 1/1969 | Freedman et al. | 224/42.45 A |

*Primary Examiner*—James T. McCall
*Attorney, Agent, or Firm*—Price, Heneveld, Huizenga & Cooper

[57] ABSTRACT

A hook for use on a vehicle is pivotally and retractably mounted to a housing integrally including bias means engaging a portion of the hook for releasably holding the hook in a retracted position presenting a flush surface when the hook is not in use. The hook pivots to an open position extending from the housing for use.

6 Claims, 5 Drawing Figures

RETRACTABLE HOOK FOR A VEHICLE

BACKGROUND OF THE INVENTION

The present invention relates to hooks and particularly to a retractable hook for use in a vehicle.

Hooks used in vehicles for hanging clothing typically comprise fixed members projecting outwardly from opposite sides of the headliner of a vehicle near the rear windows. These hooks are fixedly positioned and include an upwardly and outwardly projecting hook portion over which a conventional clothing hanger can be attached for hanging clothes in the backseat area of a vehicle. Inasmuch as the hooks project outwardly from the headliner, they present a safety hazard in the form of a projection against which a person can bump their head either while exiting the vehicle or in the event of an accident. Also, the projecting hook breaks up the continuity of the upholstery line in the headliner of the vehicle and is relatively unsightly. Since the hooks are typically infrequently used, the safety hazard and appearance factors are undesirable to the extent of nearly outweighing their usefulness. Naturally, since they project from the headliner, their size is limited such that typically only two or three hangers can be placed over these hooks and held securely.

Retractable hooks are known which present a flush appearance when in a closed or retracted position and relatively large and useful hooks when in an open extended position. Since the hooks normally are not used, when in the flush position, they do not project outwardly from the headliner of the vehicle and thereby provide a safer vehicle interior. Also, being flush with the vehicle's headliner, such hooks are neat appearing and do not distract from the continuum of the upholstery of the headliner. With such a retractable hook, the hook itself is relatively large and can accommodate a significantly greater number of hangers for use in hanging clothing or the like in a vehicle.

SUMMARY OF THE INVENTION

Hooks embodying the present invention comprise a housing having a recess therein for receiving a pivoted hook member movable between a closed position whereby the hook is flush with the housing surface and an open position whereby the hook projects outwardly for receiving hangers. The hook is pivoted on an axis extending between opposite sidewalls of the housing and the housing integrally includes bias means contacting camming means associated with the hook for releasably holding the hook in the closed flush position.

These and other features, objects, and advantages of the present invention can best be understood by reference to the following description thereof, in which:

DETAILED DESCRIPTION OF THE PREFERRED EMBODIMENT

Figure 3:
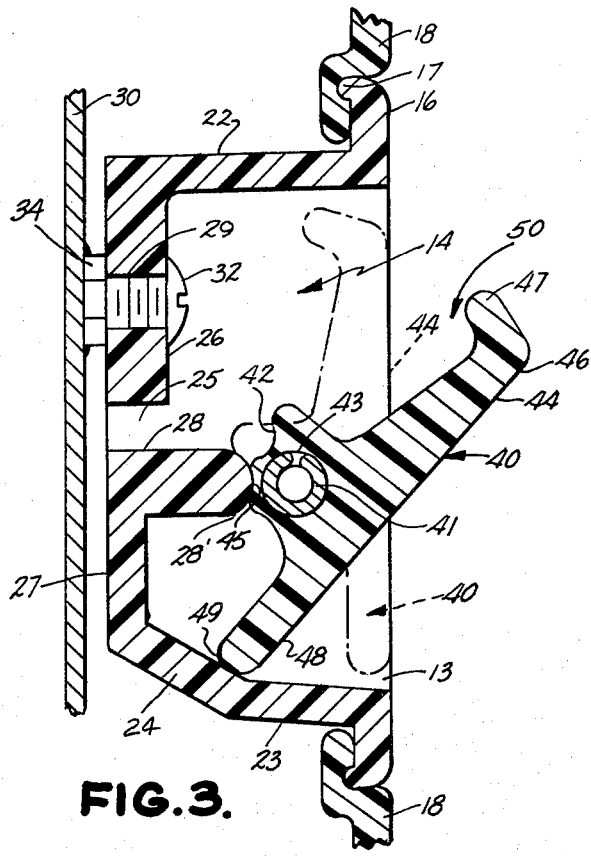
FIG. 3 is a fragmentary cross-sectional view taken along section lines III—III of FIG. 1 of the hook shown in an installed position with the hook member shown in phantom form in its retracted position.
Figure 4:
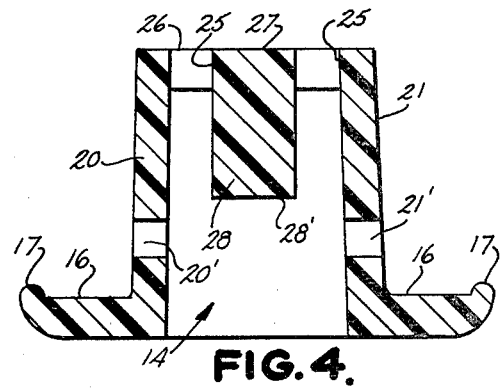
FIG. 4 is a cross-sectional view of the housing taken along section lines IV—IV of FIG. 1.
Figure 5:
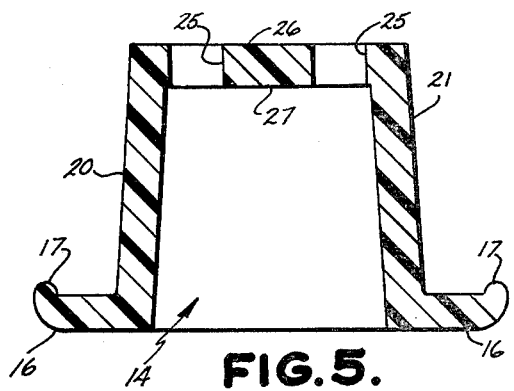
FIG. 5 is a cross-sectional view of the housing taken along section lines V—V of FIG. 1.

Referring to the Figs., hook 10 embodying the present invention includes a housing 12 having a central recess 14 (FIGS. 3, 4, and 5) for receiving a hook member 40. The housing is defined by a front wall 13 having an inverted T-shaped aperture 15 communicating with recess 14. Extending around the periphery of wall 13 is a flange 16 (FIGS. 3, 4, and 5) having a rearwardly projecting peripheral lip or bead 17 which, as best seen in FIG. 3, secures the edge of upholstery 18 of the vehicle's headliner under the flange 16 locking it in place. It is understood that the upholstery 18 has a rectangular aperture for receiving the housing which further includes rearwardly depending sidewalls 20 and 21, a top wall 22, and a lower wall comprising a first segment 23 and a second inclined segment 24 communicating with the rear wall 26.

Figure 1:
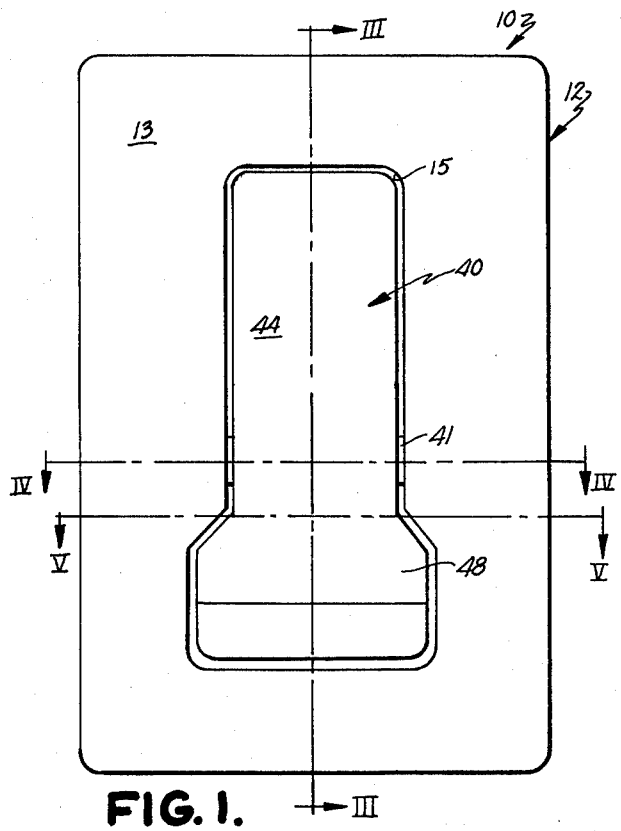
FIG. 1 is a front elevational view of a retractable hook embodying the present invention.
Figure 2:
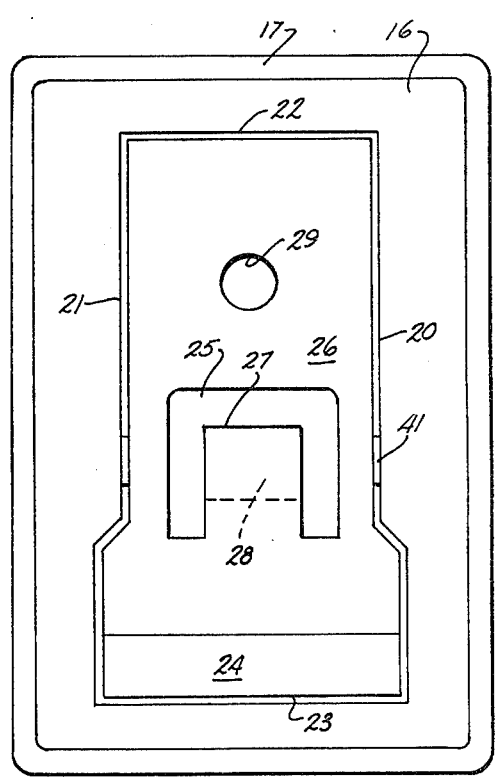
FIG. 2 is a rear elevational view of the hook shown in FIG. 1.

The rear wall includes an inverted U-shaped slot 25 as best seen in FIG. 2, isolating an upwardly projecting cantilever arm 27 integral with the rear wall 26. Wall 26 also includes an aperture 29 for securing the housing 12 to the sheet metal roof 30 of the vehicle by means of a screw 32 threaded into a nut 34 welded to the sheet metal 30 (FIG. 3). Cantilever arm 27 includes a forwardly projecting segment 28 which defines in combination with arm 27, bias means urging against a camming surface 42 of the hook member 40. Each of the sidewalls 20, 21 include an aperture 20' and 21', respectively, for receiving a pivot pin 41 (FIGS. 1, 2, and 3). As best seen in FIG. 3, pin 41 is a roll pin press-fit within an aperture 43 (FIG. 3) extending transversely through the body of hook member 40.

As best seen in FIG. 1, hook member 40 has a front surface 44 having an inverted T-shaped configuration and of dimension slightly smaller than that of opening 15 in the front wall 13 of housing 12. As seen in FIG. 3, in phantom, front surface 44 is co-planar with the front surface 13 of the housing when hook member 40 is in its closed position with recess 42 engaging the rounded end 28' of bias means 28. Thus, with the hook in the retracted position shown in FIG. 1 and in phantom form in FIG. 3, the hook substantially fills the opening of the housing to present a flat and substantially continuous surface.

The hook member 40 integrally includes an upper arm 46 having an inwardly and upwardly projecting hook 47 thereon and an enlarged central portion defining the camming surface 42 and through which pin receiving aperture 43 transversely extends. Camming surface 42 comprises a concavely curved recess extending the width of the hook member 40 and provides a snap acting releasable lock holding the hook in a closed, flushed position as seen in phantom form in FIG. 3. The central portion also includes a second camming surface 45 engaging end 28' of the biasing means when the hook is in an open position as shown in FIG. 3. Hook 40 integrally includes a lower arm 48 with a rounded end 49 which contacts the inner inclined surface of rear wall section 24 as shown in FIG. 3 to hold the hook in a predetermined open position against further rotation for use. In this position, the hook defines an opening 50 between the front surface 13 of the housing and the upper arm 46 for receiving clothing hangers or other objects to be held.

Housing 12 and hook member 40 are each injection molded of a resilient polymeric material such as polycarbonate which can be colored to match the vehicle's interior.

These members could alternately be made of a wide variety of materials including metals such as aluminum so long as the material has sufficient resiliency for providing the integral bias means between the housing and hook member. The hook is opened by pressing against the enlarged lower leg 48 as best seen in FIG. 1, pivoting the hook to the open position shown in FIG. 3.

It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows.

1. A retractable hook for use in a vehicle, said hook comprising:
   a housing comprising a rear wall, sidewalls and upper and lower walls joined to define a hook receiving recess, said rear wall integrally defining bias means extending forwardly and said sidewall including means spaced from said rear wall for supporting a pivot pin;
   a hook member integrally including first and second arms joined at an enlarged portion, said enlarged portion including an aperture extending therethrough for receiving a pivot pin;
   a pivot pin pivotally mounting said hook member to said housing; and
   said enlarged portion further including recess means selectively engaged by said bias means for releasably holding said hook member in a flush position with respect to said housing whereby said hook pivots about said pivot pin to an open position with said first end extending from said housing and said second end contacting said housing to hold said hook member in position.

2. The hook as defined in claim 1 wherein said bias means comprises said rear wall including a U-shaped slot forming a cantilevered arm in said rear wall and said cantilevered arm extends forwardly forming an end to engage said recess of said hook means.

3. The hook as defined in claim 2 wherein said hook member has a substantially flat outer surface which substantially fills the opening of said recess when said hook is in a retracted position.

4. The hook as defined in claim 3 wherein said housing includes a flange extending outwardly from forward edges of said walls.

5. The hook as defined in claim 4 wherein said flange includes a rearwardly projecting peripheral bead for securing upholstery material behind said flange.

6. The hook as defined in claim 5 wherein said forwardly extending end of said cantilevered arm is rounded to conform to the shape of said recess in said hook member.

* * * * *